US012731451B2

(12) United States Patent
Karjalainen et al.

(10) Patent No.: US 12,731,451 B2

(45) Date of Patent: Sep. 8, 2026

(54) LOCKING SYSTEM OF ONE OR MORE BUILDINGS

(71) Applicant: İLOQ Oy, Oulu (FI)

(72) Inventors: Tomi Karjalainen, Oulu (FI); Juha Lepistö, Oulu (FI)

(73) Assignee: iLOQ Oy, Oulu (FI)

( * ) Notice: Subject to any disclaimer, the term of this patent is extended or adjusted under 35 U.S.C. 154(b) by 115 days.

(21) Appl. No.: 18/727,038

(22) PCT Filed: Jan. 5, 2023

(86) PCT No.: PCT/EP2023/050178

§ 371 (c)(1),
(2) Date: Jul. 5, 2024

(87) PCT Pub. No.: WO2023/131646

PCT Pub. Date: Jul. 13, 2023

(65) Prior Publication Data

US 2024/0420531 A1 Dec. 19, 2024

(30) Foreign Application Priority Data

Jan. 7, 2022 (EP) .................................... 22150537

(51) Int. Cl.
*G07C 9/00* (2020.01)

(52) U.S. Cl.
CPC ..... *G07C 9/00904* (2013.01); *G07C 9/00857* (2013.01); *G07C 2009/00412* (2013.01);
(Continued)

(58) Field of Classification Search
CPC ............ G07C 9/00904; G07C 9/00857; G07C 2009/00412; G07C 2009/00753;
(Continued)

(56) References Cited

U.S. PATENT DOCUMENTS

| | | | | |
|---|---|---|---|---|
| 9,595,145 | B2 * | 3/2017 | Avery | B60R 25/01 |
| 9,710,987 | B2 * | 7/2017 | Scoggins | G07C 9/28 |

(Continued)

FOREIGN PATENT DOCUMENTS

| | | | |
|---|---|---|---|
| GB | 2517527 | A | 2/2015 |

OTHER PUBLICATIONS

International Search Report for PCT/EP2023/050178 dated Mar. 24, 2023, 3 pages.

(Continued)

*Primary Examiner* — Curtis J King

(74) *Attorney, Agent, or Firm* — Nixon & Vanderhye PC

(57) ABSTRACT

This document discloses a solution for configuring access rights in a locking system comprising a plurality of electromechanical locks and a plurality of keys to users of the system. Each key stores encrypted data defining an opening right to a particular subset of the plurality of electromechanical lock, the subset of locks assigned to the respective user. The system further comprises a service key storing, as a default, no encrypted data to any of the subsets of locks. The system further comprises a computer program product configured to receive, via a user interface of a personal electronic device of a user, a write authorization from the user of a specific subset of the plurality of electromechanical locks that are assigned to the user; in response to the write authorization, an opening right of the service key is generated for the specific subset of the plurality of electromechanical locks as the encrypted data, and the generated encrypted data containing the opening right to the specific subset of the plurality of electromechanical locks is written to the service key after checking the user has access rights to the specific subset of the plurality of electromechanical locks. Thereafter, the service can be used to open the subset of the plurality of electromechanical locks.

20 Claims, 4 Drawing Sheets

(52) U.S. Cl.
CPC .............. *G07C 2009/00753* (2013.01); *G07C 2009/0088* (2013.01)

(58) Field of Classification Search
CPC .. G07C 2009/0088; G07C 2009/00865; G07C 9/00944; G07C 2009/00769; G07C 2009/00825
See application file for complete search history.

(56) References Cited

U.S. PATENT DOCUMENTS

| | | | | |
|---|---|---|---|---|
| 9,870,665 | B2 * | 1/2018 | Maiwand | G07C 9/00896 |
| 11,004,282 | B1 * | 5/2021 | Bajaj | G07C 9/257 |
| 11,308,747 | B1 * | 4/2022 | Sahani | G07C 9/28 |
| 12,499,724 | B2 * | 12/2025 | Saito | G07C 9/27 |
| 2007/0041622 | A1 * | 2/2007 | Salva Calcagno | G06V 40/1359 382/124 |
| 2010/0079239 | A1 * | 4/2010 | Ghosh | G07C 9/27 340/5.21 |
| 2012/0213362 | A1 * | 8/2012 | Bliding | G07C 9/00309 340/5.61 |
| 2012/0293642 | A1 * | 11/2012 | Berini | G06V 40/197 348/77 |
| 2014/0049366 | A1 | 2/2014 | Vasquez | |
| 2016/0292524 | A1 * | 10/2016 | Weiss | G06V 40/50 |
| 2017/0243225 | A1 * | 8/2017 | Kohli | G06Q 20/40145 |
| 2018/0313115 | A1 * | 11/2018 | Overgaard | E05B 47/0002 |
| 2019/0260589 | A1 * | 8/2019 | Tang | H04W 12/06 |
| 2020/0013246 | A1 * | 1/2020 | Vega | G06F 3/0488 |
| 2020/0334344 | A1 * | 10/2020 | Schwartz | H04L 63/0861 |
| 2021/0192876 | A1 * | 6/2021 | Tikkanen | G07C 9/00817 |
| 2023/0035825 | A1 * | 2/2023 | Kemppainen | G06Q 10/06 |
| 2023/0067674 | A1 * | 3/2023 | Lee | H04W 12/06 |
| 2023/0125828 | A1 * | 4/2023 | Akutsu | G06Q 10/10 340/5.52 |
| 2023/0196857 | A1 * | 6/2023 | Shen | G07C 9/00817 340/5.61 |
| 2024/0080317 | A1 * | 3/2024 | Fabjanski | G07C 9/27 |
| 2024/0137437 | A1 * | 4/2024 | Sun | G07C 9/00857 |
| 2024/0141695 | A1 * | 5/2024 | Lessard | G07C 9/00309 |
| 2024/0153326 | A1 * | 5/2024 | Saito | G07C 9/00563 |

OTHER PUBLICATIONS

Written Opinion of the ISA for PCT/EP2023/050178 dated Mar. 24, 2023, 9 pages.
International Preliminary Report on Patentability for PCT/EP2023/050178 dated dated Apr. 5, 2024, 39 pages.
Extended European Search Report for EP Application No. 22150537.3 dated Jul. 1, 2022, 11 pages.
Sep. 24, 2025 Office Action issued in Japanese Patent Application No. 2024-541107, pp. 1-3 [English translation included].

* cited by examiner

LOCKING SYSTEM OF ONE OR MORE BUILDINGS

CROSS-REFERENCE TO RELATED APPLICATIONS

This application is the U.S. national phase of International Application No. PCT/EP2023/050178 filed Jan. 5, 2023 which designated the U.S. and claims priority to EP 22150537.3 filed Jan. 7, 2022, the entire contents of each of which are hereby incorporated by reference.

FIELD

Various embodiments relate to a locking system of one or more buildings.

BACKGROUND

If a user of a lock loses a key to the lock, the key is stolen or user leaves the key inside, a locksmith needs to break the lock. Another solution to the lost key problem is a so-called master key. The master key operates a set of locks. Each of these master-keyed locks may be opened with a specific key (=a change key) only for that lock, and the master key, which operates all the locks in the set. However, the master-keyed lock system has a security risk: if the master key is misplaced, criminal actions become quite easy. Furthermore, master-keyed locks may be prohibited by law in some jurisdictions, or are not commercially viable due to consumer preferences.

Electromechanical locks are emerging to replace the traditional mechanical locks. The lost key problem remains the same for the electromechanical locks, and the master key solution has the same problems as with the mechanical locks. The key of such a lock may have a traditional design, or be in the form of a tag or a key fob, and the opening (access) right of the key to a particular lock is inside a memory of the key as encrypted data, instead of being mechanically machined in the key bit (or blade).

BRIEF DESCRIPTION

According to an aspect, there is provided subject matter of independent claims. Dependent claims define some embodiments.

One or more examples of implementations are set forth in more detail in the accompanying drawings and the description of embodiments.

LIST OF DRAWINGS

Some embodiments will now be described with reference to the accompanying drawings, in which FIG. 1 illustrates a system to which embodiments described below can be applied;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

Figure 1:
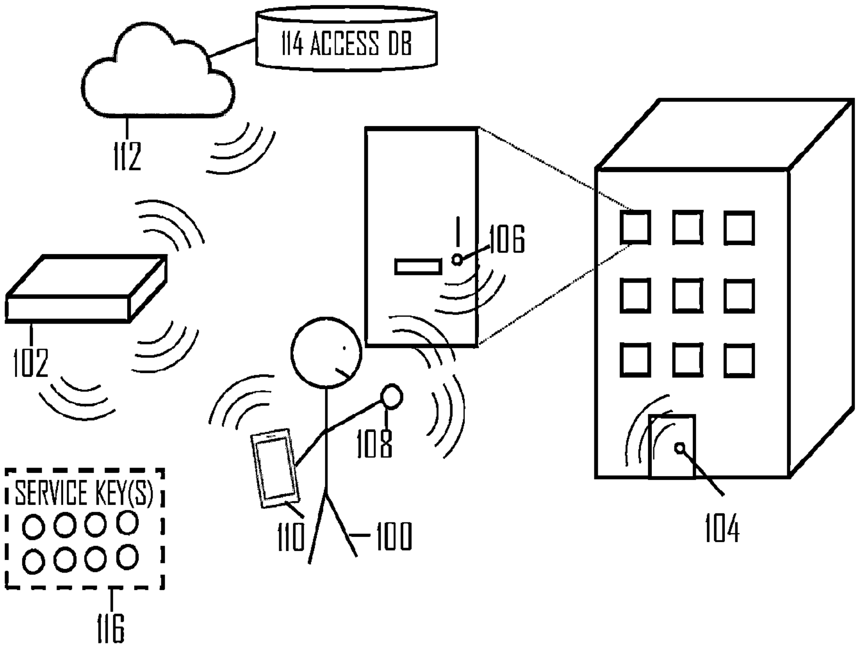

FIG. 1 illustrates a system to which embodiments described below may be applied. As described above, the context of the present embodiments may be that the user 100, having a key 108 assigned to the user and configured to open one or more locks 106 assigned to the user. In the context of residential buildings, the key 108 may be configured to open a lock to the user's home, e.g. an apartment in a residential building. The key 108 may further be configured to open one or more commonly accessible locks, e.g. an entrance lock 104 at the entrance to the building. As described in Background, the user 100 may forget the key 108 inside the apartment when the user 100 leaves the apartment. In such a case, the user would have to alert service personnel managing with the master key, and the service personnel would then arrive with the master key to open the lock 106 for the user 100. As described in Background, there are security risks in having such master keys.

Referring to FIG. 1, a locking system of one or more buildings comprises a plurality of electromechanical locks 104, 106, each electromechanical lock comprising a communication interface to exchange encrypted data with a key, an actuator to set the electromechanical lock to an open state or to a closed state, and a processor to evaluate encrypted data read from the key to decide whether to set the electromechanical lock to the open state or to remain in the closed state. The electromechanical locks may be powered via mains, via battery, or be self-powered. Self-powering may be realized electromechanically when inserting the key to the lock, thereby operating a generator in the lock, or by supplying electrical power to the lock wirelessly during an authentication operation.

The one or more buildings may form at least one of a residential building, a commercial building, an office building, a retail building, a hotel, an industrial building, a housing estate, a campus, a factory, a hospital, a building complex. In each building, the user may have a subset of the electromechanical locks of the system, including at least one lock, that is assigned to the user. The assigned lock(s) may be to the user's home or a personal office space, to a personal locker, a personal cabinet, or a similar asset. There may be at least one lock to which only the user 100 (or his/her family) has access. There may be at least one lock 106 to which only one key 108 (or two keys or a very limited set of keys) has been configured to have an opening right.

The locking system further comprises a plurality of keys, e.g. the key 108, each key comprising a memory to store encrypted data defining an opening right to one or more of the plurality of electromechanical locks, an interface to exchange encrypted data with the one or more of the plurality of electromechanical locks, each key being authorized to operate within the locking system. These keys may be so-called user keys. Each user of the system may have such a key configured to have opening rights to a particular subset of electromechanical locks of the system. Each user may have opening rights to a unique subset of electromechanical locks of the system. In most scenarios, the subsets of the different users are mutually exclusive, meaning that no one of the locks in one of the subsets belongs to another one of the subsets. However, there may be scenarios where one lock is accessible to multiple users and, in such scenarios, a lock may belong to multiple subsets. However, it may be that none of the locks in the subsets is accessible to all users of the system. Some locks of the system may be accessible to all users, e.g. the lock 104 at the entrance. In other words, these user keys may have the encrypted data and respective opening rights stored in a static or even permanent manner. In another embodiment, the user keys comprise a wireless or wired transceiver to exchange encrypted data wirelessly with a reader/writer in order to program or reprogram the user keys. In an embodiment, this transceiver is the interface configured also to exchange the encrypted data to the electromechanical lock being accessed. In other words, not separate interface is needed for programming the user keys.

The system further comprises one or more service keys 116 that may have the same hardware and software as the user keys described above. Additionally, the service key(s) 116 may have the above-described wireless or wired transceiver to receive the encrypted data defining an opening right to a particular lock or a set of locks, and the service key(s) are configured with the capability for reprogramming, as described in the embodiments below. The memory of a service key may store as a default no encrypted data defining an opening right. The term "no encrypted data" may refer data that is not encrypted, in other words is unencrypted. Hence, the service key may store the unencrypted data that defines the locking system (the specific subset of locks) that can be opened with the service key after receiving the opening rights. The opening right(s) for the specific subset of the locks may be generated as the encrypted data. The unencrypted data and the encrypted data shall match such that the opening rights are for the same specific subset of the plurality of electromechanical locks as defined in the unencrypted data stored as a default in the service key. In another embodiment, the service key is configured with an opening right to one or more commonly accessible locks of the locking system, e.g. the lock 104 at the entrance to a building or a lock to a storage room accessible to all inhabitants of a residential building. Even in such a case, the one or more service keys 116 stores by default stores as a default no encrypted data defining an opening right to the unique subsets of electromechanical locks of the system, i.e. to the privately accessible locks of the users of the system.

In an embodiment, the service key(s) is/are, by default, authorized to operate within the locking system. The authorization may be carried out by storing a communication security key (an encryption key) to the service key(s), meaning that the security key(s) has/have the capability of communicating with the locks of the system. The security key may be unique to the system, thus distinguishing the system from the other locking systems.

The system may further comprise a server computer or a server system 112 (e.g. a cloud server) accessible via the Internet or via computer and/or communication networks. The server system may comprise a database 112 storing, for a user of a specific subset 106 of the plurality of electromechanical locks, information on access rights of the user 100 to the specific subset of the plurality of electromechanical locks, wherein the specific subset of the plurality of electromechanical locks is assigned to the user. Similar information may be stored for the other users of the system in the database. The electromechanical locks may be online at least during an access action when a key attempts to access a particular electromechanical lock. The accessed lock may communicate with the server during to authenticate the accessing key. Another solution for online communication is updating access rights or performing a software/firmware update or upgrade to the locks, wherein respective operation may be conducted via communication with the server. The communication connection between the server and the online lock(s) may be conducted via a gateway device communicating with the locks according to a wireless or wired communication protocol and providing the locks with access to the server. In another embodiment, the locks are offline locks requiring no connection with the server at any stage. The authentication during the access may be conducted via a device-to-device communication between an accessed lock and an accessing key over a wired or a short-range wireless communication protocol.

The user may own a personal electronic device 110 that may be a part of the system or be external to the system. The personal electronic device may be a mobile phone or a smart phone, or another smart device (e.g. a tablet computer) owned and carried by the user 100. The system may, however, comprise a computer program product readable by at least one processor of the personal electronic device 110 of the user 100 and configuring the at least one processor to carry out the steps or functions described in the embodiments below in connection with an authorization application below. The computer program product may configure the at least one processor to execute the authorization application so as to carry out the steps or functions. The computer program product may be a mobile application downloadable and installable to any mobile device operating a mobile operating system such as iOS® or Android®, for example. The computer program product may store, in a memory of the personal electronic device, partially or fully the same access rights of the user 100 as the database 114. Naturally, the memory of the personal electronic device The system may further comprise a reader/writer 102 configured to program the service keys 116. The reader/writer 102 belonging to the system may be a separate electronic device having, in a casing, an input/output interface to communicate with the service keys and to program the service keys with opening rights to the locks or a subset of locks of the system. The reader/writer device may further comprise a (wireless) communication interface or transceiver to communicate with the server 112 and/or with the personal electronic device, as described in the embodiments below. The reader/writer may be a peripheral device of the personal communication device. The reader/writer device may further comprise a processor or a processing circuitry to carry out application level communication with the server 112 and the personal electronic device 110, and to control the input/output interface to carry out the programming.

In an embodiment, the reader/writer is comprised in the personal electronic device. The computer program product may employ a reader/writer device readily present in the smart devices, e.g. a near-field communication (NFC) circuit. As known in the art, NFC describes a technology for contactless exchange of data over short distances. In this embodiment, the keys 108, 116 may also have an NFC circuit. Two NFC devices are connected via a point-to-point contact over a distance of a few centimeters. This connection can be used to exchange data between the devices and, in the embodiments described herein, the data comprises the opening rights as encrypted data. The NFC is not, however, the only possible reader/writer solution to the smart devices and, alternatively, Bluetooth (or another protocol based on IEEE 802.15) circuits of the personal electronic device and the keys 108, 116 may be employed in the embodiments below to program the service keys.

Figure 2:
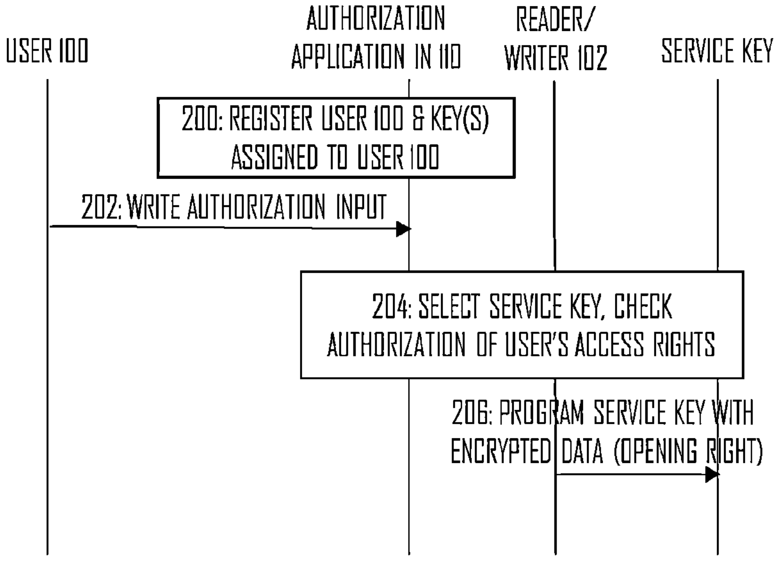
FIG. 2 illustrates a signalling diagram of a procedure for configuring opening rights according to an embodiment.

Let us then describe the operation of a computer-implemented process for programming the service key with reference to FIG. 2. Referring to FIG. 2, the user 100 and one or more personal keys 108 assigned to the user are registered to the system in block 200. Block 200 may comprise storing, in the database, information on access rights of the user to a specific subset of the electromechanical locks of the system, wherein the specific subset of the plurality of electromechanical locks is assigned to the user. As described above, the specific subset may include a lock to the user's personal property such as an apartment (home). Block 200 may be carried out when the user buys or rents the apartment or is otherwise assigned with access to the specific subset of the electromechanical locks of the system.

In step 202, the user 100 uses a user interface of the personal electronic device to input a write authorization to the specific subset of the plurality of electromechanical locks and, correspondingly, the authorization application defined by the above-described computer program product and executed by at least one processor of the personal electronic device 110 receives the write authorization input via the user interface of the personal electronic device 110 of the user 100 in step 202. Step 202 may be conducted after 200, and the duration between 200 and 202 may be long, e.g. days, weeks or even years. Step 202 may occur upon the user loses his/her personal key 108 or leaves it behind the lock 106 or another unexpected event occurs. The write authorization may include a user instruction to authorize programming of a service key and, furthermore, the write authorization may indicate (explicitly or implicitly) one or more or all electromechanical locks (of the subset) that shall be openable with the programmed service key. The user may be associated with the specific subset of electromechanical locks in the database 114, and the write authorization may by default encompass all the locks of the specific subset. In another embodiment, the user may manually enter or select the one or more (not all) electromechanical locks of the subset that shall be programmed to the service key. In practice, the user may operate the user interface of the authorization application executed in the personal electronic device to open an authorization function of the authorization application. The authorization application may then present the subset of electromechanical locks to the user for the selection. The list of presented locks may be filtered to consist of the subset of electromechanical locks, while those electromechanical locks not included in the subset are not presented to the user. This is one way of controlling that the user cannot select a lock for which the user has not access right.

In an embodiment, the authorization application may present to the user a list of service keys, and the user may select which one of the service keys shall be programmed by inputting a selection input indicating the selected service key via the user interface. The write authorization may thus indicate an identifier of the service key that shall be programmed.

In response to the write authorization in step 202, the authorization application may configure the reader/writer 102 to generate an opening right of the specific subset of the plurality of electromechanical locks as encrypted data (block 204). The authorization application may communicate an identifier of each electromechanical lock that shall be openable with the programmed service key, and the reader/writer may generate the opening right and the encrypted data. Alternatively, the authorization application may generate the opening right and the encrypted data and communicate the encrypted data to the reader/writer 102. In still another embodiment, the authorization application generates the opening right, and the reader/writer encrypts the opening right into the encrypted data. In yet another embodiment, the server is used to generate the opening right, as described in the embodiment of FIG. 4, and either the server or the reader/writer may carry out the encryption of the opening right into the encrypted data. The opening right may comprise a security token applicable to the particular electromechanical lock(s) of the subset. The security token may comprise a cryptographic key, a password token, or a challenge-response token applicable to open the particular electromechanical lock(s). The security token may then be encrypted with the security key used for communicating within the system, thus generating the encrypted data. In some embodiments, the encrypted data is substantially similar to the encrypted data programmed to the user's own key 108. In an embodiment, the encrypted data is identical to the encrypted data programmed to the user's own key 108. Further if the write authorization indicated the selected service key, the authorization application may deliver the identifier of the selected service key to the reader/writer 102.

Upon generating the encrypted data and being configured by the authorization application (or the server), the reader/writer writes the generated encrypted data containing the opening right to the service key in step 206, and the opening right is stored in a memory of the service key. If the reader/writer has received the identifier of the service key that shall be programmed, the reader/writer may verify, before conducting the programming, that a service currently communicating with the reader/writer has the received identifier. If the verification is positive, the programming may commence. If the service key communicates a different identifier to the reader/writer, the reader/writer may suspend the programming and output an error notification to the authorization application. The writing is performed after checking in block 204 that the user has access rights to the specific subset of the plurality of electromechanical locks. After the writing the subset of the plurality of electromechanical locks is openable with the programmed service key. The opening may be carried out via state-of-the-art authentication procedure between the service key and the electromechanical lock of the subset. When accessing the lock of the subset with the service key programmed with the opening right, the encrypted data is exchanged between the service key and the lock and, in response to said exchanging, a processor of the lock uses an actuator of the lock to set the lock to an open state. In a case where the opening right is invalid, the processor of the lock may decline the opening.

In an embodiment, the writing is performed after checking that the service key is authorized to operate within the locking system. This may be based on checking whether or not the reader/writer is able to communicate with the service key. A communication channel between the reader/writer 102 and the service key may be established upon bringing the selected service key within the proximity of the reader/writer, and the reader/writer 102 may transfer a query to the service key by using the security key of the system. If the service key responds to the query with a meaningful response, e.g. by transmitting a message encrypted with a security key matching with the security key of the system, the reader/writer may determine that the service key is authorized to operate in the system. In other words, the check may include checking whether or not the reader/writer and the service key are configured with matching encryption keys dedicated to the locking system and enabling encrypted communication between the reader/writer and the service key. Simply put, the reader/writer may determine that the service key is authorized to operate in the system, if the reader/writer is capable of encrypted communication with the service key. The checking that the user has access rights to the specific subset of the plurality of electromechanical locks may be carried out at one of several instances. One instance is the authorization application presenting only the subset of electromechanical locks to the user for said authorization. Another instance is after receiving the user input where the authorization application may check the database 114 or the database of the memory of the personal electronic device for the access rights of the user. Yet another instance is the reader/writer receiving the indication of the subset of lock(s) from the authorization application, wherein the reader/writer may transmit the user's 100 identifier also provided by the authorization application and the identifier(s) of the subset of electromechanical lock(s) to the server 112. The server may then check the database 114 for the access rights of the user 100 to the provided lock identifier(s). If the user has access rights to all lock(s) of the subset, the server may output an authorization to write the service key with the respective opening right. If the user has no access rights to one or more of the lock(s) of the subset, the server may output an authorization declined message to the reader/writer, and the reader/writer may again inform the authorization application that the programming of the service key has been declined.

The user may thus have a right to issue the write authorization only to the locks assigned to the user, and the assigned locks may form a subset of all the locks in the system. In common use cases, the subset forms a clear minority of all the locks of the system. The number of locks assigned to the user may be at least a decade smaller than the locks in the system. The number of locks assigned to the user may be one, two, or three locks while the number of locks in the system may be in the order of dozens, hundreds or even thousands. This distinguishes from solutions where a master user is able to authorize writing for all the locks of the system.

In the embodiments where the reader/writer 102 is in the personal electronic device 110, the communication between the authorization application and the reader/writer may be via an application programming interface of the personal electronic device and/or via firmware or a software driver of the reader/writer. In the embodiments where the reader/writer 102 is external to the personal electronic device, the communication between the authorization application and the reader/writer may be carried over wireless transceivers of the personal electronic device and the reader/writer. The communication may be direct peer-to-peer communication over a single radio link, while in other embodiments the communication is carried out via a communication network comprising at least two radio links between the devices 102, 110.

Figure 3:
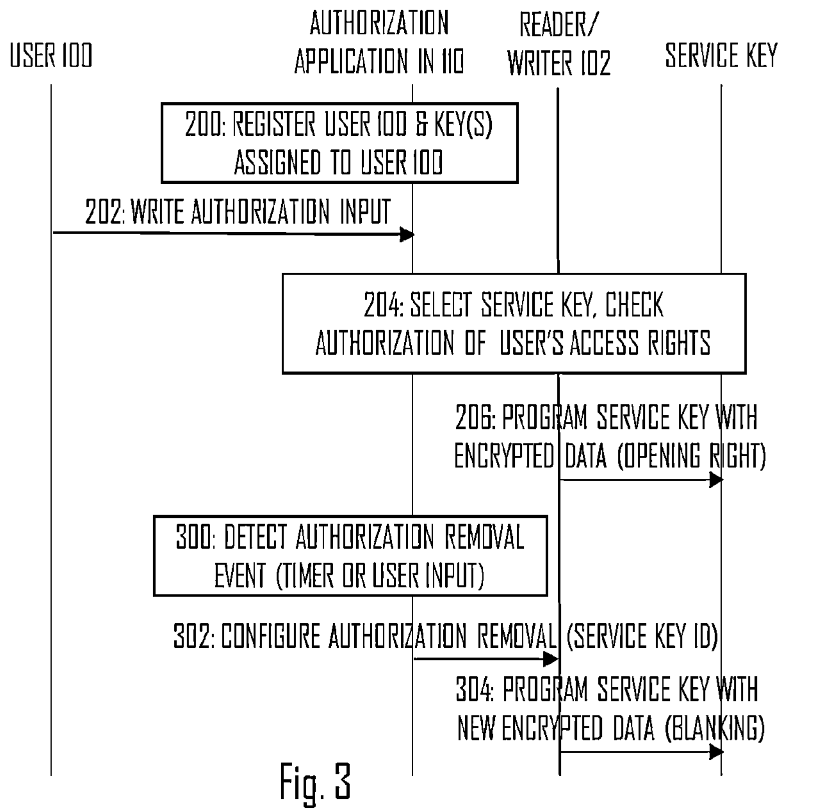
FIG. 3 illustrates a signalling diagram of a procedure for configuring removal of opening rights according to an embodiment.

In an embodiment, the opening right programmed to the service key is temporary, and the opening right may be configured to expire on its own, or the opening right may be cancelled via reconfiguration. In an embodiment, the encrypted data programmed to the service key includes a time period defining the validity duration of the opening right. The electromechanical lock may keep track of time and, upon performing authentication with the service key and receiving information on the time period from the key, check whether or not the time period is still running. If the time period is still running and the opening right is valid, the electromechanical lock may open the lock. Otherwise, the electromechanical key may decline the opening. In another embodiment, the service key may include a timer, and a processor of the service key may be configured to invalidate the encrypted data and the opening right upon expiry of the time period. The invalidation may be carried out by overwriting or blanking memory regions of the service key that store the encrypted data. FIG. 3 illustrates yet another embodiment of removing the opening right from the service key.

In the embodiment of FIG. 3, the computer program product is configured to cause the at least one processor of the personal electronic device to generate a removal of the opening right for the specific subset of the plurality of electromechanical locks as new encrypted data, and to write, using the reader/writer, the new encrypted data containing the removal of the opening right to the service key. Referring to FIG. 3, the authorization application may detect (block 300) an authorization removal event that triggers the removal of the opening right from the service key programmed in step 206. In an embodiment, block 300 is based on receiving, via the user interface of the personal electronic device, a delete authorization from the user 100. In another embodiment, the event in block 300 is a timer-based, e.g. the authorization application may use a clock of the personal electronic device to measure the expiry of the opening right. Upon detecting the event, the authorization application may trigger a procedure for removing the opening right. The procedure may comprise configuring the reader/writer 102 to remove the opening right from the service key (step 302). Step 302 may include identifying the service key to be reprogrammed in some manner. One way is to communicate an identifier of the service key to the reader/writer. Another solution is to manually bring the respective service key to the proximity of the reader/writer. Thereafter, the reader/writer may reprogram (step 304) the service key by removing or invalidating the opening right, e.g. by blanking described above. Thereafter, the service key returns to its default state described above.

One use case for the programming in step 206 and the reprogramming in step 304 is that the user manually picks the service key and brings the service key to the proximity of the reader/writer. The selection of the service key to be (re) programmed and respective indication of the selected service key is thus carried out via the controlled proximity of the service key. In embodiments where the communication distance of the reader/writer is very small, e.g. a few centimetres, the service key to be (re) programmed can be identified to the reader/writer explicitly. Another solution would be to provide an identifier of the service key as a label on the service key, and the user may use the user interface of the authorization application on the personal electronic device to specify the identifier of the service key to be programmed to the authorization application that may then forward the identifier to the reader/writer.

In an embodiment, upon programming and/or reprogramming the service key, the user is notified of the successful (re) programming via the authorization application and the user interface of the personal electronic device. Upon (re) programming the service key, the reader/writer may communicate the successful (re) programming to the authorization application that may then output the user notification.

In the above-described embodiments, the scenario may be that the user initiates the programming of the service key, e.g. upon forgetting the key 108 to the apartment. In an embodiment, the service key is an emergency key containing the encrypted data defining no opening right in the memory during a storage period, whereas the emergency key contains the encrypted data defining the opening right of the specific subset of the plurality of electromechanical locks during an emergency use period, and the emergency key is by default in the storage period, and only intermittently in the emergency use period. In this case, the authorization application may receive, from the server, a request for access to the specific subset of electromechanical locks, and the authorization application may output, in response to the request, a notification to the user via the user interface. The notification may indicate an emergency situation and request the user to grant the opening right. If the user approves granting the opening right, the programming may be carried out under the control of the server 112 according to the procedure of FIG. 4. In this case, the write authorization input in step 202 is the approval from the user via the user interface.

Figure 4:
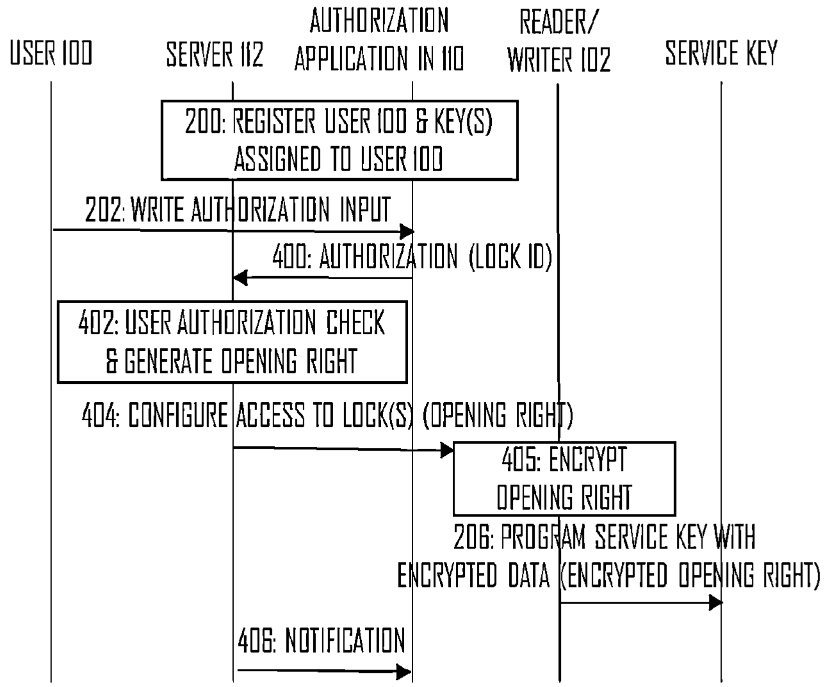
FIG. 4 illustrates a signalling diagram of a further embodiment for configuring opening rights to a service key.

Referring to FIG. 4, upon receiving the write authorization input via the user interface in step 202, the authorization application may transmit an authorization message to the server in step 400. Since the authorization application has registered to the server with the user's 100 credentials, it may be implicitly known to the server which subset of locks to program. On the other hand, in case only a subset of the electromechanical locks assigned to the user shall be programmed, either the request from the server or the authorization in step 400 may identify the subset of electromechanical locks to be programmed with the opening right. The authorization of the user to grant the opening right to the specified lock(s) may be verified in block 402. Each lock may be associated with a unique identifier (e.g. a character string), and each user account in the server (and/or in the authorization application) may store unique identifier(s) of the locks assigned to the user. In the embodiment where the server requests for the programming, block 402 may be carried out by the server before transmitting the request by the user. In such a case, the server may first determine the electromechanical locks to which the opening right is required and, then, find the respective users by accessing the database and transmit the respective requests for programming the service key(s) with the opening rights to the respective users via respective authorization applications in the users' personal electronic devices.

Upon receiving the authorization to program the service key with the opening right associated with the user 100 in step 400, the server may configure the reader/writer 102 to program the service key with the opening right. The opening right may be generated in the server and encrypted by the reader/writer, for example. Thereafter, the process may proceed in the above-described manner in step 206 and, upon completing the programming, the reader/writer 102 may communicate the notification (step 406) of the programming to the authorization application either directly or via the server 112.

With respect to the above-described programming of the service key, the service key may comprise at least one processor and at least one memory storing computer program instructions of a computer program product carrying out the programming in the service key and carrying out communication with the reader/writer or with the server during the programming. In an embodiment where the server or the authorization application directly controls and oversees the programming, application layer communication with respect to the programming may be carried out between the service key and the server (or the authorization application), and the personal electronic device and the reader/writer are used only to provide lower communication protocol layers. The reader/writer may still carry out the encryption of the opening right as a part of the lower-layer protocol. In other embodiments, the reader/writer 102 controls the programming on the application layer and, thus, the communication during the programming is only between the reader/writer and the service key.

In an embodiment, the system further comprises a key safe to store the service key(s) 116, the key safe comprising an attachment mechanism to fix the key safe to a wall or a floor in the building, to a wall or a floor in a hall or a staircase of the building, to a wall or a floor in a locked space of the building, or to a wall or a floor in a service centre. When the need arises, the user 100 or the service personnel may access the key safe to acquire a service key for the programming. The key safe may comprise one of the electromechanical locks of the system openable by using the personal electronic device and the computer program product, or with a user apparatus of service personnel of the locking system. In an embodiment, computer program product may, together with the personal electronic device, operate as a key to the key safe. Therefore, the need for the key 108 may be circumvented. The computer program product may use the memory of the personal electronic device to store opening right to the key safe and use the NFC circuit or a similar proximity transceiver circuit to deliver the opening right to the electromechanical lock of the key safe to open the key safe. In another embodiment, the user may operate the user interface of the authorization application to send a request for opening the key safe to the server. In case there are multiple key safes to which the user 100 has access rights, the request may define which key safe shall be opened. The user may be requested to carry out authentication such as entering a personal identification number (PIN) or via biometric authentication (fingerprint etc.), for example, before proceeding with the transmission of the request to the server. Upon receiving the request from the authorization application via the personal electronic device, the server may verify from the database 114 that the user has access rights to the key safe and, upon verifying of the valid access rights, send a command to the electromechanical lock of the key safe to open. Other solutions for accessing the key safe are naturally possible.

In an embodiment, at least one of the plurality of electromechanical locks of the system is an entrance electromechanical lock 104 at an entrance of the building, comprising a wireless interface to exchange encrypted data with the computer program product via the personal electronic device, an actuator to set the entrance electromechanical lock to an open state or to a closed state, and a processor to evaluate encrypted data read from the personal electronic device to decide whether to set the entrance electromechanical lock to the open state or to remain in the closed state. Similar to the solution described above in connection with the key safe, the memory of the personal electronic device may store an opening right of the user to open the entrance electromechanical lock. The authorization application is then configured to cause the at least one processor of the personal electronic device to receive an authorization from the user to use an entrance opening right in the encrypted data to open the entrance electromechanical lock, e.g. via the user interface similarly to the key safe embodiment above. In response to the authorization, encrypted data containing the entrance opening right may be exchanged with the entrance electromechanical lock via the wireless interface of the lock. If the entrance opening right is valid for the entrance electromechanical lock, the processor of the lock uses the actuator to open the lock for the user.

The entrance electromechanical lock may comprise an interface to receive electrical energy from the mains for an operation of the actuator of the entrance electromechanical lock and the processor of the entrance electromechanical lock. Alternatively, the entrance electromechanical lock may comprise an interface to receive electrical energy wirelessly from a wireless transceiver of the personal electronic device for the operation of the actuator of the entrance electromechanical lock, and the processor of the entrance electromechanical lock.

Figure 5:
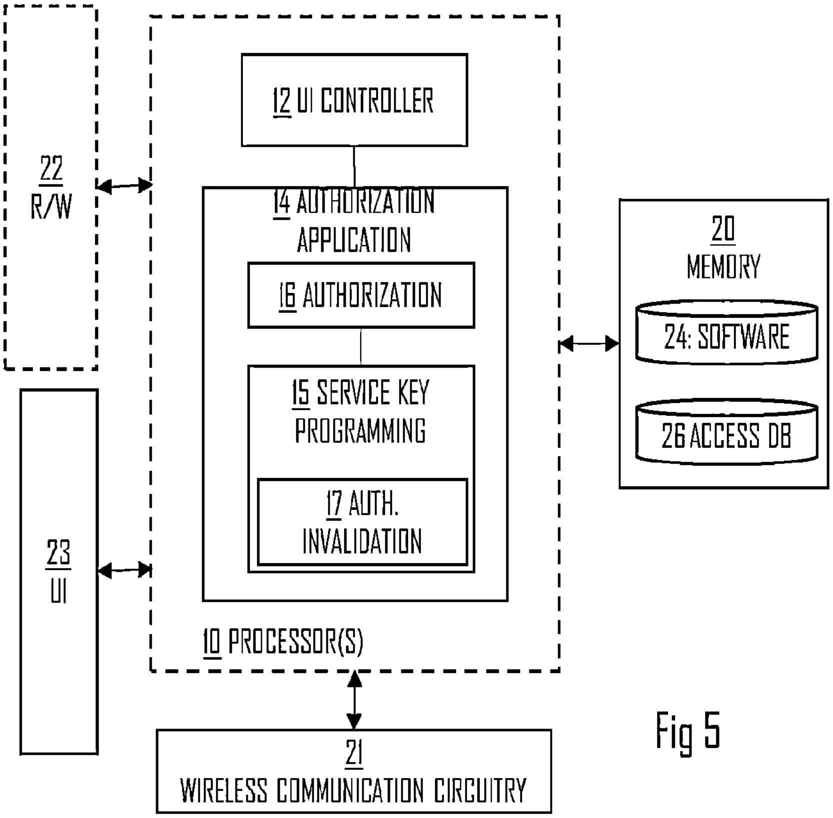
FIG. 5 illustrates components of a personal electronic device according to an embodiment.
Figure 6:
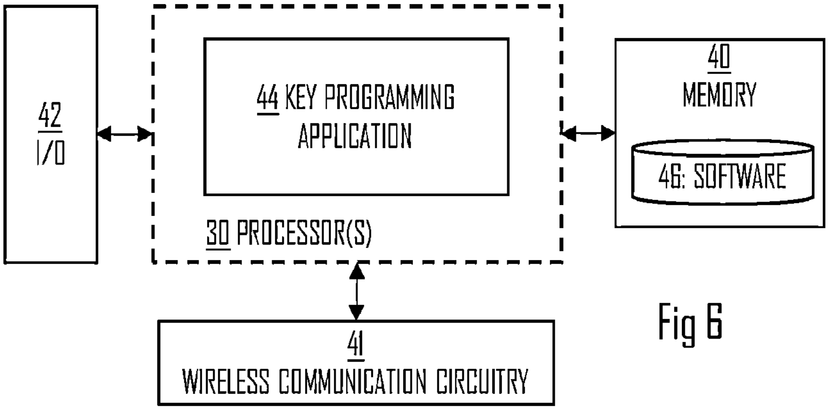
FIG. 6 illustrates components of a reader/writer device according to an embodiment.

Let us then describe the components of the personal electronic device and the reader/writer with reference to FIGS. 5 and 6, respectively. FIG. 5 illustrates the personal electronic device that may be, as described above, a portable smart device owned by the user 100. The personal electronic device may comprise at least one processor 10 and at least one memory 20 storing the computer program product (software) 24 described above. The memory may further store access rights of the user 100 in a database 26, as described above.

The computer program product may have been downloaded from the server 112 or from a separate application server to the memory 20. Accordingly, the personal electronic device may initially be without the authorization application and the respective computer program product, and the authorization application may be installed to the device by the user. Upon receiving a user input to launch the authorization application, the processor 10 may read the computer program product and respective computer program instructions and execute the authorization application 14. The authorization application may then configure the processor 10 to carry out one or more of the above-described embodiments of the authorization application. The authorization application may comprise an authorization module 16 configured to carry out processing of the write authorization input received (step 202) via a user interface (UI) 23 and a respective user interface controller module 12 of the processor and, further, participate in the execution of block 204 as described above. The authorization module may, for example, verify the access rights of the user to authorize the programming of the service key to the indicated subset of electromechanical locks. Upon clearing the authorization check, the authorization application may employ a service key programming module to generate the opening right and to communicate the opening right to the reader/writer via a communication interface with the reader/writer.

As described above, the reader/writer 22 may be a part of the personal electronic device. In such embodiments, the reader/writer may have dedicated hardware such as the NFC circuit in the personal electronic device and, further have software or firmware that allows the processor 10 to control the reader/writer. In other embodiments, the authorization application 14 may communicate the opening right to the external reader/writer via a wireless communication circuitry 21 of the personal electronic device. The wireless communication circuitry may support any one or more of the known communication protocols for communicating the opening right, e.g. Bluetooth, WiFi (IEEE 802.11), or a cellular communication protocol.

The authorization application may further have an authorization invalidation module 17 configured to invalidate the opening right programmed to the service key, e.g. upon detecting any one of the above-described events triggering the invalidation. The authorization invalidation module may thus carry out steps 300 and 302 of the process of FIG. 3.

In an embodiment, the personal electronic device is comprised in the locking system described above.

FIG. 6 illustrates components of the reader/writer 102, and the described components are equally applicable to the external reader/writer and to the reader/writer comprised in the personal electronic device. In the latter case, some components such as the processor(s) 30 may be the processor(s) 10 or belong to the same processing circuitry as the processor(s) 10. The reader/writer may include an input/output (I/O) interface 42 configured to program the service key by writing the encrypted data comprising the opening right to the service key. The I/O interface may support the NFC protocol, for example, or another wireless short range or contactless communication protocol for programming the service key. In another embodiment that applies also to the embodiments described above, the counterpart communication interfaces (transceivers) of the service key and the reader/writer may support a wired communication protocol. For example, the key may be inserted into the reader/writer in order to bring the interfaces into physical (mechanical) contact, thereby realizing a wired connection between them for carrying out the programming.

A key programming application 44 executed as a computer process by the processor 30 may control the programming and also communication with the authorization application 14 and/or with the server 112 in the above-described embodiments. The communication may be carried out via a wireless communication circuitry that may support any one or more of the above-described communication protocols. The key programming application 44 may be stored as a computer program product 46 in a memory 40 of the reader/writer. The key programming application may carry out at least some functions of the steps 204, 206, 302, 304, and 404. In some embodiments where the programming and respective communication with the service key is controlled and conducted by the server or the authorization application, the key programming application may be provided in the server or as a part of the authorization application, respectively. In such embodiments, the reader/writer may still have a processor configured to manage lower communication protocol layers between the key programming application and the service key.

The processor described above would cover all implementations of the microprocessors known in the art, including an implementation of merely a single processor and multiple processors and a portion of a processor, e.g. one core of a multi-core processor, and its (or their) accompanying software and/or firmware. The term would also cover, for example and if applicable to the particular element, an application-specific integrated circuit (ASIC), and/or a field-programmable grid array (FPGA) circuit for the respective devices described above. It should be noted that the processors in the server, personal electronic device, reader/writer device, and the electromechanical lock may be structurally different because the required processing power and required capabilities are different.

Figure 7:
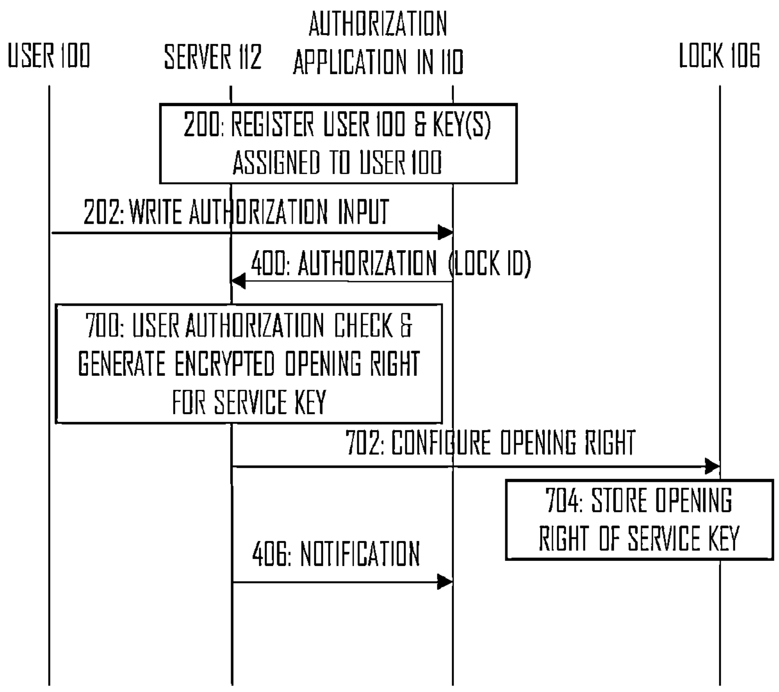
FIG. 7 illustrates yet another embodiment of a procedure for configuring opening rights.

Above, embodiments for programming the service key to access the specific subset of locks assigned to the user has been described. An equivalent embodiment would be to use the authorization application to program the specific subset of locks to grant access to a general service key. This may be carried out in connection with the embodiment where the locks are online or are accessible by the server via a communication link, e.g. through the gateway. The server or the authorization application may generate the encrypted opening right according to any one of the above-described embodiments and deliver the opening right to the lock(s) of the specific subset, and the respective lock(s) may, upon receiving the encrypted opening right, store the encrypted opening right. In this solution no programming of the service keys may be needed and the reader/writer may also be omitted. FIG. 7 illustrates a signalling diagram according to this embodiment.

Referring to FIG. 7, in response to the write authorization received in step 202, the authorization application may cause generation of an opening right of the service key for the specific subset of the plurality of electromechanical locks (e.g. lock 106) as the encrypted data, and cause writing of the generated encrypted data containing the opening right to the specific subset of the plurality of electromechanical locks after checking the user has access rights to the specific subset of the plurality of electromechanical locks. Either the authorization application or the server may execute and control the programming of the specific subset of locks. For example, the authorization application may, in response to the write authorization input, communicate the authorization message to the server in step 400 in the above-described manner. The server may then check the access rights of the user to authorize the programming of the subset of locks and generate the (encrypted) opening right for the service key in block 700. The service keys may store the same security token, and the opening right may include definitions that configure the subset of locks to open upon receiving the security token of the service key(s). Accordingly, in this embodiment all service keys may be programmed to open the subset of locks by configuring the lock in the above-described manner. In step 702, the server communicates the encrypted opening right to the subset of locks (e.g. lock 106), and the lock(s) 106 store the opening right for the service key in block 704. Upon completing the programming, the server may communicate the notification of successful programming to the authorization application in step 406, as described above. In a further embodiment, the checking that the service key is authorized to operate in the system is carried out by the lock 106 in the sense that the service key is able to communicate its security token to the lock only if the service key and the lock 106 are able to communicate with one another.

After the programming, the encrypted data between the service key and one of the specific subset of the plurality of electromechanical locks is exchanged. The encrypted data may comprise the opening right stored into the service key beforehand as a default. In response to said exchanging, if the lock has been configured with the opening right of the service key, the actuator of the lock is set to an open state. If the opening right of the service key has not been programmed to the lock, the lock is maintained in the closed state.

The processes or methods described in FIGS. 2 to 4 and 7 or any of the embodiments thereof may also be carried out in the form of one or more computer processes defined by one or more computer programs. In particular, the functions of the authorization application and the personal electronic device may be defined by the computer program described above. Similarly, the functions of the server computer may be defined by a computer program product stored, read, and executed in the server computer. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit (processor) or it may be distributed amongst a number of processing units. References to computer-readable program code, computer program, computer instructions, computer code etc. should be understood to express software for a programmable processor such as programmable content stored in a hardware device as instructions for a processor, or as configured or configurable settings for a fixed function device, gate array, or a programmable logic device.

Even though the invention has been described with reference to one or more embodiments according to the accompanying drawings, it is clear that the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

The invention claimed is:

1. A locking system of one or more buildings comprising:

a plurality of electromechanical locks, each electromechanical lock comprising a communication interface configured to exchange encrypted data with a key, an actuator configured to set the electromechanical lock to an open state or to a closed state, and a processor configured to evaluate encrypted data read from the key to decide whether to set the electromechanical lock to the open state or to remain in the closed state;

a plurality of keys, each key comprising a memory configured to store encrypted data defining an opening right to one or more of the plurality of electromechanical locks, an interface configured to exchange encrypted data with the one or more of the plurality of electromechanical locks, each key being authorized to operate within the locking system;

a database configured to store, for a user of a specific subset of the plurality of electromechanical locks, information on access rights of the user to the specific subset of the plurality of electromechanical locks, wherein the specific subset of the plurality of electromechanical locks is assigned to the user;

a service key, by default authorized to operate within the locking system, comprising a memory configured to store no encrypted data defining, as a default, an opening right to the specific subset of the plurality of electromechanical locks, and further comprising a transceiver configured to receive encrypted data from a reader/writer; and a computer program product readable by at least one processor of a personal electronic device of the user configured to cause the at least one processor to carry out at least the following:

receive, via a user interface of the personal electronic device, a write authorization from the user of the specific subset of the plurality of electromechanical locks; and in response to the write authorization, cause generation of an opening right of the specific subset of the plurality of electromechanical locks as the encrypted data, and use a reader/writer to write the generated encrypted data containing the opening right to the service key after checking that the user has access rights to the specific subset of the plurality of electromechanical locks.

2. The locking system of claim 1, wherein the service key is, by being configured with an encryption key of the locking system, authorized to operate within the locking system and the computer program product is configured to cause the at least one processor to check, before writing the generated encrypted data to the service key, whether or not the reader/writer and the service key are configured with matching encryption keys dedicated to the locking system and enabling encrypted communication between the reader/writer and the service key.

3. The locking system of claim 1, wherein the reader/writer comprises a wireless transceiver configured to receive the encrypted data from the personal electronic device.

4. The locking system of claim 1, wherein the reader/writer is comprised in the personal electronic device.

5. The locking system of claim 1, wherein the computer program product is configured to cause the at least one processor to generate a removal of the opening right for the specific subset of the plurality of electromechanical locks as new encrypted data, and to write, using the reader/writer, the new encrypted data containing the removal of the opening right to the service key.

6. The locking system of claim 5, wherein the computer program product is configured to cause the at least one processor to receive via the user interface a delete authorization from the user before writing the encrypted data containing the removal of the opening right to the service key.

7. The locking system of claim 1, wherein the service key is an emergency key containing the encrypted data defining no opening right in the memory during a storage period, whereas the emergency key contains the encrypted data defining the opening right of the specific subset of the plurality of electromechanical locks during an emergency use period, and the emergency key is by default in the storage period, and only intermittently in the emergency use period.

8. The locking system of claim 1, further comprising a key safe configured to store the service key, the key safe comprising an attachment mechanism to fix the key safe to a wall or a floor in the building, to a wall or a floor in a hall or a staircase of the building, to a wall or a floor in a locked space of the building, or to a wall or a floor in a service centre.

9. The locking system of claim 8, wherein the key safe comprises an electromechanical lock openable by using the personal electronic device and the computer program product, or with a user apparatus of service personnel of the locking system.

10. The locking system of claim 1, wherein:

at least one of the plurality of electromechanical locks is an entrance electromechanical lock at an entrance of the building, comprising a wireless interface configured to exchange encrypted data with the computer program product via the personal electronic device, an actuator configured to set the entrance electromechanical lock to an open state or to a closed state, a processor configured to evaluate encrypted data read from the personal electronic device to decide whether to set the entrance electromechanical lock to the open state or to remain in the closed state; and wherein the computer program product is configured to cause the at least one processor to receive an authorization from the user to use an entrance opening right in the encrypted data to open the entrance electromechanical lock, and to exchange the encrypted data containing the entrance opening right with the entrance electromechanical lock.

11. The locking system of claim 10, wherein the entrance electromechanical lock comprises an interface configured to receive electrical energy from the mains for an operation of a wired interface of the entrance electromechanical lock, the actuator of the entrance electromechanical lock, and the processor of the entrance electromechanical lock, or an interface to receive electrical energy wirelessly from a wireless transceiver of the personal electronic device for the operation of the wired interface of the entrance electromechanical lock, the actuator of the entrance electromechanical lock, and the processor of the entrance electromechanical lock.

12. The locking system of claim 1, wherein the one or more buildings form at least one of a residential building, a commercial building, an office building, a retail building, a hotel, an industrial building, a housing estate, a campus, a factory, a hospital, a building complex.

13. The locking system of claim 1, wherein a number of electromechanical locks in the specific subset of the plurality of electromechanical locks is less than a half of the plurality of electromechanical locks.

14. A computer-implemented method for a locking system comprising a plurality of electromechanical locks and a plurality of keys, the method comprising:

storing, in a database for a user of a specific subset of the plurality of electromechanical locks, information on access rights of the user to the specific subset of the plurality of electromechanical locks, wherein the specific subset of the plurality of electromechanical locks is assigned to the user;

receiving, via a user interface of a personal electronic device of the user, a write authorization from the user of the specific subset of the plurality of electromechanical locks;

in response to the write authorization, generating an opening right of the specific subset of the plurality of electromechanical locks as encrypted data;

upon generating the encrypted data, using a reader/writer to write the generated encrypted data containing the opening right to a service key storing as a default no encrypted data defining an opening right, the service key by default being authorized to operate within the locking system, wherein the writing is performed after checking that the user has access rights to the specific subset of the plurality of electromechanical locks; and exchanging the encrypted data between the service key and one of the specific subset of the plurality of electromechanical locks and, in response to said exchanging, using an actuator of said one of the specific subset of the plurality of electromechanical locks to set said one of the specific subset of the plurality of electromechanical locks to an open state.

15. The computer-implemented method of claim 14, wherein the service key is, by being configured with an encryption key of the locking system, authorized to operate within the locking system, the method further comprising:

checking, before writing the generated encrypted data to the service key, whether or not the reader/writer and the service key are configured with matching encryption keys dedicated to the locking system and enabling encrypted communication between the reader/writer and the service key.

16. The computer-implemented method of claim 14, further comprising:

generating a removal of the opening right for the specific subset of the plurality of electromechanical locks as new encrypted data; and writing, using the reader/writer, the new encrypted data containing the removal of the opening right to the service key.

17. The computer-implemented method of claim 16, further comprising receiving via the user interface a delete authorization from the user before writing the encrypted data containing the removal of the opening right to the service key.

18. The computer-implemented method of claim 14, wherein the service key is an emergency key containing the encrypted data defining no opening right in the memory during a storage period, whereas the emergency key contains the encrypted data defining the opening right of the specific subset of the plurality of electromechanical locks during an emergency use period, and the emergency key is by default in the storage period, and only intermittently in the emergency use period.

19. The computer-implemented method of claim 14, wherein:

at least one of the plurality of electromechanical locks is an entrance electromechanical lock at an entrance of the building, comprising a wireless interface configured to exchange encrypted data via the personal electronic device, an actuator configured to set the entrance electromechanical lock to an open state or to a closed state, a processor configured to evaluate encrypted data read from the personal electronic device to decide whether to set the entrance electromechanical lock to the open state or to remain in the closed state, and the method further comprising:

receiving an authorization from the user to use an entrance opening right in the encrypted data to open the entrance electromechanical lock, and to exchange the encrypted data containing the entrance opening right with the entrance electromechanical lock.

20. A locking system of one or more buildings comprising:

a plurality of electromechanical locks, each electromechanical lock comprising a communication interface configured to exchange encrypted data with a key, an actuator configured to set the electromechanical lock to an open state or to a closed state, and a processor configured to evaluate encrypted data read from the key to decide whether to set the electromechanical lock to the open state or to remain in the closed state;

a plurality of keys, each key comprising a memory configured to store encrypted data defining an opening right to one or more of the plurality of electromechanical locks, and an interface configured to exchange encrypted data with the one or more of the plurality of electromechanical locks, each key being authorized to operate within the locking system;

a database configured to store, for a user of a specific subset of the plurality of electromechanical locks, information on access rights of the user to the specific subset of the plurality of electromechanical locks, wherein the specific subset of the plurality of electromechanical locks is assigned to the user;

a service key, by default authorized to operate within the locking system, comprising a memory configured to store no encrypted data defining, as a default, an opening right to the specific subset of the plurality of electromechanical locks, and further comprising a transceiver configured to receive encrypted data from a reader/writer; and a computer program product readable by at least one processor of a personal electronic device of the user and configured to cause the at least one processor to carry out at least the following:

receive, via a user interface of the personal electronic device, a write authorization from the user of the specific subset of the plurality of electromechanical locks; and in response to the write authorization, cause generation of an opening right of the service key for the specific subset of the plurality of electromechanical locks as the encrypted data, and cause writing of the generated encrypted data to the service key, after checking that the user has access rights to the specific subset of the plurality of electromechanical locks.

* * * * *